INVENTOR
Charles E. Krause

BY *Allan M. Lowe*

ATTORNEY

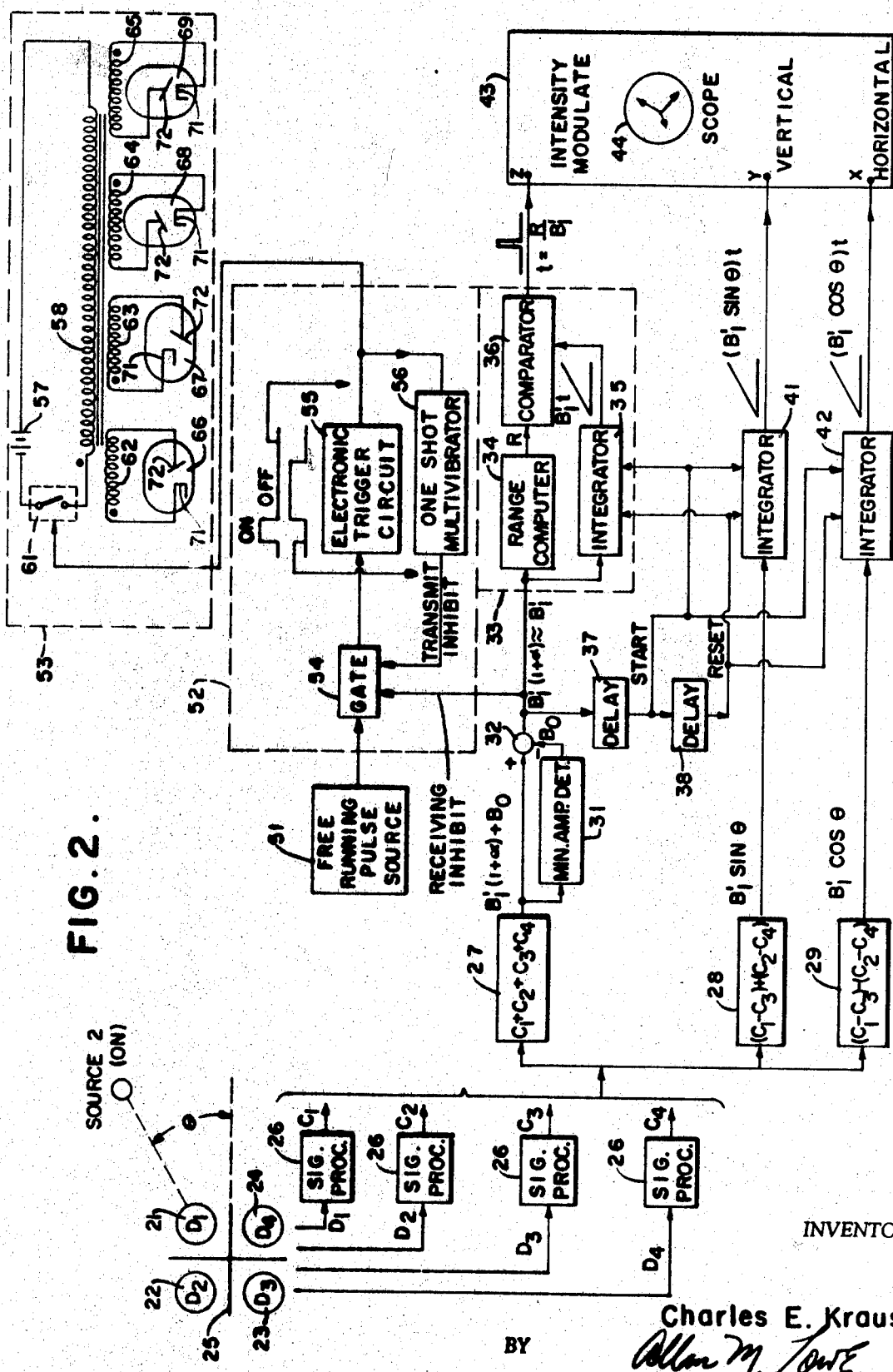

United States Patent Office 3,546,458
Patented Dec. 8, 1970

3,546,458
POSITION DETECTING SYSTEM AND METHOD UTILIZING PULSED PENETRATING RADIATION
Charles Edgar Krause, Westerville, Ohio, assignor, by mesne assignments, to the United States of America as represented by the United States Atomic Energy Commission
Filed Oct. 20, 1966, Ser. No. 588,205
Int. Cl. G01t 1/16
U.S. Cl. 250—83.3
21 Claims

ABSTRACT OF THE DISCLOSURE

Disclosed are a system and method for detecting the position of objects, wherein each object includes a pulsed penetrating radiation source. The pulsed energy is transmitted between the objects and detected on each, processed and displayed on a PPI oscilloscope in a single time shared channel. The pulse repetition rate on each object is normally related by a prime number to the rate on other objects. In response to reception of a pulse on one of the objects, the generation of a pulse from that object is precluded for a predetermined time period.

---

Figure 1:
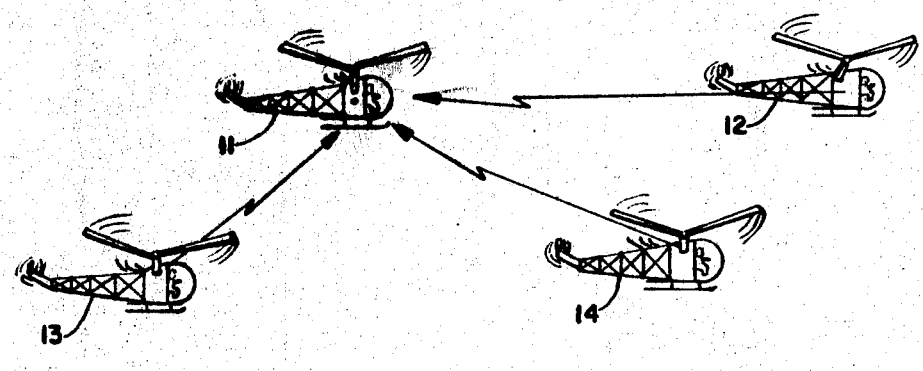

The present invention relates generally to systems and methods for determining the relative position between a plurality of objects and more particularly to a system and method for indicating the range and distance between an object carrying a stationary radiation responsive detector and a plurality of objects, each having a pulsating penetrating radiation source.

In the copending and commonly assigned patent application of Leonard Carlton Brown, entitled "Range and Angular Position Detector," there is disclosed a system for determining the relative position between a plurality of objects utilizing penetrating radiation. As defined in the Brown application and utilized herein, penetrating radiation is electromagnetic energy that: has a wavelength shorter than light waves; that is penetrative of clouds and fog; and is not capable of being readily focused, refracted or reflected. Typical examples of penetrating radiation are X-rays and nucleonic sources.

In the Brown application, the relative range and angular direction between a pair of objects are determined by employing a penetrative radiation source on the first object and a stationary or fixedly mounted array of penetrating radiation receivers on the second object. The array comprises at least three and preferably four, substantially identical and symmetrically arranged receivers that are shadowed from each other by shields interposed between them, as well as by the receivers themselves. By providing an array as specified, the outputs of the several receivers can be considered as periodic with respect to the angular position of the source, but phase displaced with respect to each other. By summing the responses from the several receivers and selectively subtracting the responses from them, information indicative of the range and angular position between the two objects is derived with a data processor on board the second object.

In addition to disclosing a system for measuring the relative position between a pair of objects, the aforementioned application of Brown discloses a system wherein the relative range and angular position between more than two objects can be determined. To determine the relative position between a multiplicity of objects, it is necessary for each object to emit penetrating radiation continuously at a predetermined, fixed modulation frequency which is different for each source in the group of objects. The radiation level is continuously modulated at fixed frequency by mechanically rotating an apertured shield, or the like, about a nucleonic source. Each object also includes a receiving array that feeds a data processor. The data processor separates the different frequencies and feeds them into separate data processing channels to derive range and angle information for each object in the group. In the case of helicopter formation keeping, one of the disclosed uses for the Brown system, establishment of a priori knowledge regarding all source modulation frequencies in the group, and separation thereof, is frequently difficult, if not impossible.

According to the present invention, the disadvantages associated with the system disclosed in the copending Brown application are obviated by utilizing a penetrating radiation source that is pulsed, i.e. switched between ON and OFF states, rather than a continuous source modulated at fixed frequency. The radiation pulses are derived at a fixed frequency, whereby the several transmitting objects can be considered as being in a time sharing relationship to each other. By pulsing the radiation sources, X-rays, rather than nucleonic energy, can be employed, thereby completely eliminating all moving parts associated with the transmitter and receiver. The need for multiple data processing channels for each received modulation frequency is obviated since a single data processing channel is time shared between the transmitting radiation sources. Of course, with time sharing there is no need for a priori knowledge relative to the radiation modulation frequencies derived from the other objects in the group.

Time sharing is made possible, according to the present invention, by enabling only one object in the group of objects being considered to radiate energy at any time. To accomplish this result, circuitry is provided for connecting the source and receiving array of each object so that radiation from the source is inhibited simultaneously with the array responding to radiation from another source. To enable radiation to be emitted from all of the objects in the group, whereby lengthy gaps between pulses from one source do not occur, each source is blocked for a predetermined time period subsequent to the derivation of an energy pulse. The time interval during which a source is blocked after it has emitted a radiation pulse is greater than the period normally between adjacent pulses. Thereby, each source in the group is gated on, statistically, an equal number of times over a relatively short sampling period.

An inherent feature of the signal processing apparatus associated with the present invention is that if two sources within the group should be activated at the same time, an erroneous indication is not generally derived. This feature is attained because the indicator to which the human responds and observes visually is of the cathode ray beam, plane position indication (PPI) type. The position of each source in the group is displayed on the PPI as a spot displaced by a distance equal to the range between the object on which the receiver is located and the object on which the source is located and at an angle commensurate with the angle between the two objects. The range and angle information are computed utilizing the sum and difference techniques mentioned supra in response to the pulse amplitudes derived from the several receivers constituting the array. If two sources are activated simultaneously, the sum and difference signals differ from when only a single pulse is transmitted at a time so that the PPI spot is at different positions for the two situations. Because the time during which the target position is displayed is relatively short, the probability of two sources being activated simultaneously is low, and cathode ray displays generally have an inherent integrating nature, a human observer of the oscilloscope face will not generally see the erroneous results occurring if two sources should be activated simultaneously.

It is a further feature of the present invention that a completely electronic system is utilized for processing the received data and transposing it to the PPI. The use of a completely electronic system is in contrast with the electro-mechanical apparatus disclosed in the previously mentioned Brown application. Basically, electronic display of the range and angle information is derived by integrating the angle indicating difference signals which are applied to the deflection plates of the PPI cathode ray tube. The integrated difference signals are displayed at a time directly proportional to the range between the two objects, whereby a presentation exactly like a radar PPI is derived.

In the apparatus disclosed by the Brown application, range is computed by utilizing an operational amplifier, having a non-linear biased diode network in its feedback loop, in accordance with:

$$B_1' = \frac{Ke^{\frac{-R}{\lambda}}}{R^2} \qquad (1)$$

where:

K is a constant;
e is the base of natural logarithms;
R is range;
$\lambda$ is the mean path length of radiation related to an attenuation constant; and
$B_1'$ is the average response from the receivers in the detecting array.

It has been found, however, that the output of the amplifier is subject to drift during relatively long time intervals, whereby inaccuracies are introduced. According to the present invention, range is transposed to a time position relative to the instant when the receiver array first responded to an energy pulse from another source. The time indication is derived by integrating the sum, range indicating pulse twice to derive a voltage that varies as a parabolic function of time, and at a rate determined by range. Simultaneously with the instigation of the parabolic function of time, a voltage that changes as an exponential function of time is generated. The time interval between the instigation of the parabolic and exponential voltages to the instant when these two voltages are the same can, from Equation 1, be related to range between the source and receiver.

It is, accordingly, an object of the present invention to provide a new and improved system and method for determining the relative position between a plurality of objects utilizing pulses of penetrating radiation.

Another object of the present invention is to provide a system for determining the relative range and angular position between a plurality of objects utilizing sources of penetrating radiation, wherein no moving parts are required on either the source or receiver.

A further object of the present invention is to provide a system and method for determining the relative range and angular position between a plurality of objects utilizing penetrating radiation sources, wherein no a priori knowledge concerning the rate at which energy is derived from the sources is required.

A further object of the present invention is to provide a system for determining the relative range and angular position of at least a pair of penetrating radiation sources relative to a penetrating radiation detector, wherein a single data processor channel is employed in conjunction with the detector.

A still further object of the present invention is to provide a new and improved data processing system responsive to signals derived from an array of penetrating radiation detectors, wherein all electronic means are utilized for activating a plane position indicator display.

Another object of the present invention is to provide a new and improved system for deriving a signal indicative of the range between a penetrating radiation source and receiver, wherein the indication is maintained accurate over relatively long time intervals.

Figure 3:
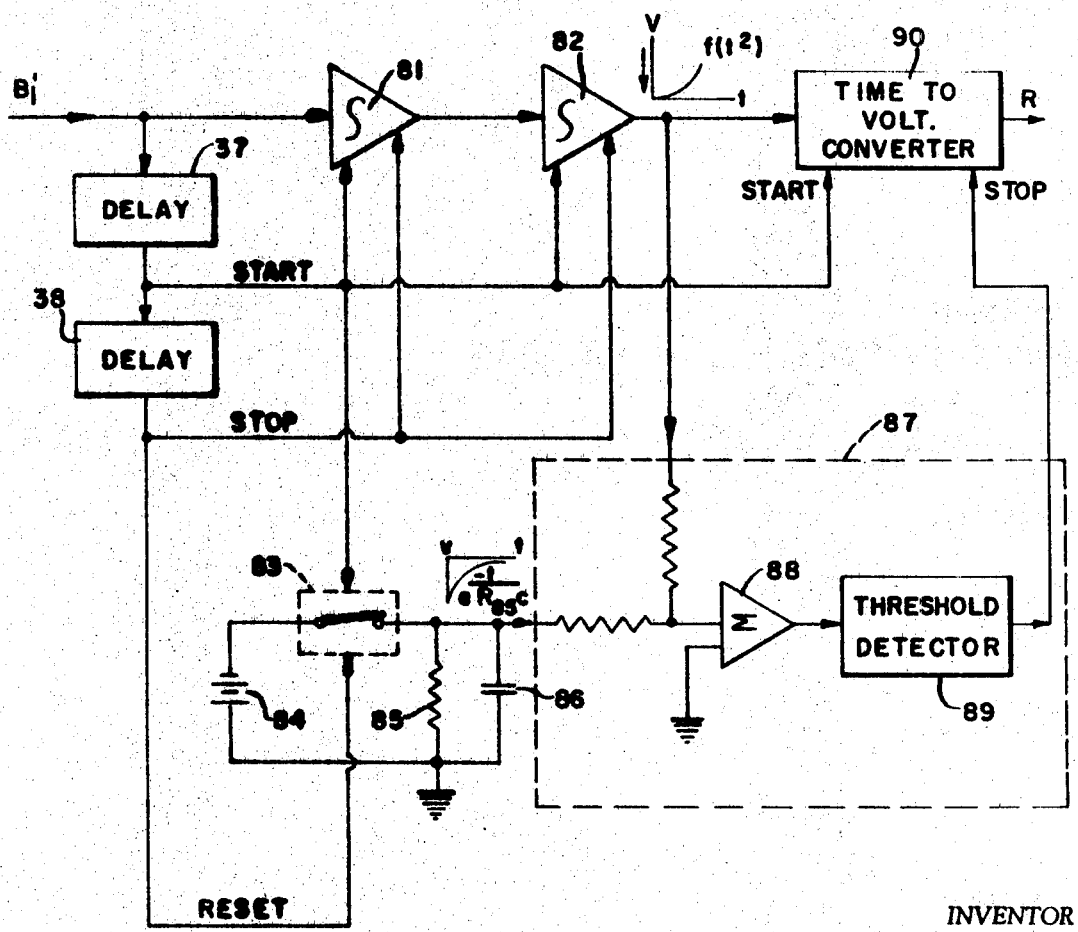

The above and still further objects, features and advantages of the present invention will become apparent upon consideration of the following detailed description of several specific embodiments thereof, especially when taken in conjunction with the accompanying drawings wherein:

FIG. 1 schematically represents a plurality of helicopters flying in formation;
FIG. 2 is a block diagram of the equipment contained on board one of the helicopters of FIG. 1; and
FIG. 3 is a circuit diagram of a modified form of a portion of FIG. 2.

While the invention is described specifically in conjunction with helicopters flying in formation, the principles are applicable to any suitable object location detection system.

Reference is now made to FIG. 1 wherein helicopters 11–13 are illustrated as flying in formation. Helicopters 11–14 generally are not separated from each other by more than 1000 feet, whereby penetrating radiation is optimumly employed for signalling the range and azimuthal positions between them. Each of helicopters 11–14 includes a stationary detector array of four penetrating radiation receivers, as disclosed in the aforementioned Brown application. In addition, each of helicopters 11–14 includes an omni-directional pulsating source of penetrating radiation, such as X-rays, which is shielded from the detector array on board the particular helicopter. X-ray pulses of approximately one millisecond duration are emitted from each of helicopters 11–14 at a different time to provide a time sharing link between the several helicopters comprising the formation. Pulses emitted from each of the helicopters in the formation are received by the other helicopters, processed to derive signals indicative of the range and angular locations of the other helicopters, and displayed on a PPI cathode ray tube face mounted on board each helicopter.

Because the X-ray source and receiver contained on board each of helicopters 11–14 is identical in construction, the following description is directed solely to the equipment contained on board helicopter 11, whereby it is validly assumed that the same manner of operation applies to the formation keeping equipment on board the other helicopters.

The equipment on board helicopter 11 illustrated in FIG. 2 comprises four symmetrically arranged scintillation detecting crystals 21–24, having radiation shields 25 disposed between them. Crystals 21–24 are fixedly mounted relative to helicopter 11 and have their arcuate edges at right angles to the plane of the paper, as illustrated in FIG. 2, responsive to radiation from the sources contained on board helicopters 12–14. Shield 25 separating detectors 21 and 24 is considered as lying along the axis of the array wherein $\theta$, the azimuth angle between helicopter 11 and the other helicopters, is zero.

Crystals 21–24 and shield 25 are arranged so that crystal receivers on the far side of a radiation source are shadowed, whereby they receive a lesser amount of energy than those crystals which are exposed directly to the source. As shown in the copending application of Brown, the relative count rate detected by each of crystals 21–24 is a sinusoidal or periodic function with respect to the angle $\theta$. Hence, if helicopter 12 is assumed as being positioned at an angle $\theta=45°$ relative to the detector array on board helicopter 11, maximum radiation impinges on detector 21, equal amounts of radiation impinge on detectors 22 and 24, and a minimum amount of radiation is coupled to detector 23.

Each of detectors 21–24 is coupled to a photomultiplier that derives electrical output pulses having count rates commensurate with the amount of radiation, flux or photons per unit time impinging on the respective crystal. The output of each photomultiplier is fed to a separate signal processing network 26. Digital or analog signal handling techniques may be employed. An analog system is described wherein signal processing networks 26 derive output signals $C_1$, $C_2$, $C_3$ and $C_4$, varying in magnitude in accordance with the amount of radiation impinging on each of scintillation crystals, 21, 22, 23 and 24, respectively.

The outputs of signal processing networks 26 are linearly combined in summing network 27 and difference networks 28 and 29, whereby the networks respectively derive signals proportional to:

$$e_{o_{27}} = C_1 + C_2 + C_3 + C_4 = B_1'(1+\alpha) + B_o \quad (2)$$

$$e_{o_{28}} = (C_1 - C_3) + (C_2 - C_4) = B_1' \sin \theta \quad (3)$$

$$e_{o_{29}} = (C_1 - C_3) - (C_2 - C_4) = B_1' \cos \theta \quad (4)$$

where: $e_{o_{27}}$, $e_{o_{28}}$, and $e_{o_{29}}$ are the output voltages of networks 27, 28 and 29, respectively;

$B_o$ is the background radiation impinging on the array comprising receivers 21–24, i.e., the radiation impinging on the receiver array when none of the sources on board helicopters 12–14 is transmitting;

$B_1'$ is the average radiation levels impinging on receivers 21–24 from one of the sources; and $\alpha$ is the leakage factor through the array, i.e., the amount of radiation impinging on a detector that is shadowed from the source.

The variable amplitude pulses derived from combining networks 27–29 have a width equal to the duration of the ON time of a transmitting radiation source on board one of helicopters 12–14. These pulses generally have a duration of approximately one millisecond and relatively steep leading and trailing edges so that they can be considered as substantially rectangular pulses of variable amplitude and constant width.

To eliminate the constant effect of background, as expressed by the term $B_o$ in Equation 2, the output of summing network 27 is fed through minimum amplitude detecting network 31. Minimum amplitude detecting network 31 is similar to a conventional peak detector but responds to the minimum output signal of summing network 27 and is unresponsive to the positive going range indicating pulses derived thereby. In consequence, the D.C. output of minimum amplitude detector 31 is a level commensurate with the background radiation impinging on the array comprising receivers 21–24.

The output of minimum amplitude detector 31 is subtracted from the amplitude of the signal generated by summing network 27 in difference amplifier 32, the output of which is at all times a signal level proportional to the average radiation impinging on the detector array from a pulsed source. During intervals when the detector array is responsive to an X-ray source, the output of difference network 32 is a voltage indicative of the range between the helicopter on which the source is located and helicopter 11. During periods when none of the sources on board helicopters 12–14 is activated, the output voltage of difference network 32 is zero. For most practical purposes, it can be validly assumed that leakage is relatively small, whereby $\alpha$ in Equation 1 is zero. Hence, during the time interval when a radiation pulse impinges on the receiver array, the voltage amplitude generated by difference network 32 is proportional to $B_1'$ and therefore a precise function of range only.

The $B_1'$ output signal from difference network 32 is fed to network 33. Network 33 derives a pulse time displaced from the reception by the detector array of an X-ray pulse by an amount proportional to the range between the helicopter carrying the source and helicopter 11. To translate the $B_1'$ voltage into a time position, network 33 includes range computer 34 and integrator 35, which are fed in parallel by the output of difference circuit 32. Range computer 34 may take the form described and illustrated in the copending application of Brown, cited supra, whereby it derives a D.C. voltage magnitude directly proportional to range in accordance with Equation 1. Integrator 35 responds to the output of difference network 32 to derive a voltage increasing as a linear function of time with a slope determined by its input, $B_1'$. The outputs of range computer 34 and integrator 35 are coupled to comparator 36, which derives a short duration pulse (e.g. $1\mu$ second) when its two inputs are equal in amplitude. Since the two inputs to comparator 36 are represented by voltages proportional to R and $B_1't$, the output thereof is a pulse occurring at a time, $$t = \frac{R}{B_1'}$$

In order for integrator 35 to function properly, the voltage across its capacitor must be maintained at zero during all time intervals except when a pulse is applied thereto by difference network 32. To insure this result, the output of difference network 32 is supplied to delay network 37, which generates a pulse on its output lead approximately 0.2 millisecond after the leading edge of the pulse from difference network 32 has begun. The output of delay network 37 is cascaded to a further delay network 38, having a delay time of approximately 1 millisecond. Each of delay networks may be a one shot multivibrator that derives pulses with trailing edges occurring at the delay times specified with respect to the leading edge of the $B_1'$ pulse from difference circuit 32.

The outputs of delay networks 37 and 38 electronically control the charging and discharging of the capacitor of integrator 35. The capacitor is charging during the interval when both the voltage $B_1'$ and the output delay network 37 is applied thereto, but is short circuited at all other times. The output of delay network 37 permits charging of the capacitor of integrator 35 at a time after the $B_1'$ pulse has been applied to network 33, for example, 0.2 millisecond, to compensate for the inherent time lag that range computer 34 introduces in transposing the $B_1'$ voltage into a signal proportional to range. Thereby, the ramp voltage from integrator 35 is initiated at a time when the range voltage applied to comparator 36 has been stabilized. The output of delay network 38 short circuits the capacitor of integrator 35, driving the integrator output voltage to zero when the $B_1'$ radiation pulse returns to a zero level. If the inputs to comparator 36 were never equal during the interval during which the capacitor of integrator 35 was charged, the radiation source that caused the $B_1'$ pulse to be derived was at a range greater than the system can handle or the pulse was erroneously derived in response to noise.

To provide angular indications of the position of the helicopter containing the source relative to helicopter 11, the $B_1' \sin \theta$ and $B_1' \cos \theta$ output voltages of networks 28 and 29 are applied to integrators 41 and 42, respectively. The capacitors in integrators 41 and 42 are short circuited at all times other than during the interval when the receiving array is responsive to radiation pulses by being connected to delay networks 37 and 38 in the same manner as integrator 35. Thereby, integrators 41 and 42 respectively derive voltages proportional to $tB_1' \sin \theta$ and $tB_1' \cos \theta$. Hence, the outputs of integrators 41 and 42 are voltages having slopes linearly proportional to the amount of radiation impinging on receivers 21–24 and having a magnitude and polarity commensurate with the magnitude and sign of the sine and cosine of the angle of the radiation impinging on the detector array.

The linearly changing voltages derived from integrators 41 and 42 are applied to the vertical and horizontal deflection plates of a cathode ray tube in oscilloscope 43 to enable a radial trace to be described by the cathode ray beam. The normally biased OFF beam of cathode ray tube 43 is biased to an ON position only in response to comparator 36 deriving a pulse at the instant when its two inputs are the same. Since the inputs to comparator 36 are equal when $$t = \frac{R}{B_1'}$$

the outputs of integrators 41 and 42 are $R \sin \theta$ and $R \cos \theta$, respectively, at the instant when the beam is allowed to impinge on face 44 of CRT. In consequence, at the instant when the cathode ray beam of oscilloscope 43 is modulated to the ON position, the voltages applied to the vertical and horizontal deflection plates of the PPI are proportional to the range of the helicopter on which the radiating source is located and the sine and cosine of the angle between the radiating source and helicopter 11. Each time that the source being considered transmits a pulse of penetrating radiation, the cathode ray beam of oscilloscope 43 is deflected in the manner indicated, whereby a relatively intense spot is built up on its phosphorescent, integrating face 44.

Network is designed to attempt to prohibit the simultaneous radiation from two or more sources, but because of the asynchronous emission of the various sources of radiation, two or more sources may actually be on simultaneously for a given instant of time, notwithstanding a low probability of simultaneous radiation. However, the erroneous signal received in such cases causes no adverse effects in the system for the following reasons. The amount of radiation impinging on the detectors is different if two sources should happen to be on simultaneously, whereby the voltages generated by networks 27–29 are different from when a single source is activated. Because the outputs of networks 27–29 are different if multiple sources are activated simultaneously, the voltage is derived from integrators 41 and 42 at the instant when the beam of oscilloscope 43 is turned ON is different from at any other instant. Because phosphorescent face 44 does not respond to only one pulsation thereof for a 1 microsecond duration, the spot corresponding with the voltages derived from multiple sources being turned ON simultaneously is not displayed on face 44. Even if the phosphor on the face 44 of oscilloscope 43 responded to a single random input, a human observer would be unable to see the spot.

The preceding discussion has been on the presumption that the sources on board helicopters 12–14 are not simultaneously activated, or if they are simultaneously activated no deleterious results occur. Consideration will now be given to the actual apparatus employed on board helicopter 11 for activating an X-ray source in a pulsating manner. The apparatus for deriving the pulsating X-rays comprises essentially three cascaded networks, namely free running pulse source 51, gating control network 52 and the combination of the X-ray tube and its power supply 53.

Pulse source 51 comprises a free running multivibrator that derives a one millisecond pulse at a frequency on the order of five cycles per second. The frequency of source 51 may be a prime number with respect to the frequencies of the pulse sources on board the remaining helicopters in the formation. The frequencies of the several pulse sources 51 on board the helicopters in the formation may be related in a prime relationship to further reduce the probability of simultaneous derivation of several pulses from other helicopters. The requirement for a priori information regarding the frequencies of pulse sources 51 on board the several helicopters in the formation can, however, be eliminated and the several sources can even have the same frequency because each X-ray source includes network 52 that prevents the simultaneous derivation of a pulse from plural X-ray sources on the helicopters in the formation. In addition, the pulses of radiation emitted occupy a relatively small interval to reduce the probability of simultaneous radiation from more than one source to a low percentage. For example, if four helicopters each emit a one millisecond pulse every 200 milliseconds the probability of pulse time coincidence is merely 2%.

Control network 52 includes gate 54 for selectively passing and blocking pulses from source 51. Gate 54 is normally open to enable pulses from source 51 to be coupled through it. Gate 54 is closed during the time interval when the receiving array on board helicopter 11 detects an X-ray pulse from any one of helicopters 12–14 by virtue of the connection between subtraction network 32 and an inhibit input terminal of the gate. The inhibit input terminal of gate 54 responds to the output of subtraction network 32 so that the gate is closed to prevent coupling of pulses from source 51 any time that the output voltage of the subtraction network rises above a level of zero volts, i.e., during the time interval when X-rays from one of the helicopters 12–14 in the formation impinge on the receiving array. Thereby, no pulses are derived from gate 54 during the interval when any of the helicopters 12–14 in the formation are emitting X-ray energy and helicopter 11 cannot emit energy during the interval when any of the remaining helicopters in the formation are transmitting X-ray pulses. The circuit between difference network 32 and gate 54 can be modified by inserting a pulse stretcher therein. A pulse stretcher decouples source 51 from power supply and X-ray source 53 for the time interval while network 32 generates a $B_1'$ output plus an added interval on the order of 5 milliseconds. The added 5 millisecond interval can be inserted if the computing networks on board each of the helicopters 11–14 require a finite recovery time to reinitiate a computation cycle.

Those pulses from source 51 that are passed through gate 54 are coupled to electronic trigger circuit 55. Trigger circuit 55 shapes each of the pulses coupled to it into a pulse having a predetermined width and amplitude. The pulses derived by trigger circuit 55 are of amplitude sufficient to activate an electronic switch and have a duration on the order of 1 millisecond, whereby the electronic data processing networks on board helicopters 12–14 respond properly to the X-ray pulses emitted from the source of helicopter 11.

To enable the X-ray sources on board all of the helicopters in the formation to be triggered and prevent one of the sources from being continuously or seldom triggered, the output of trigger circuit 55 is stretched in one-shot multivibrator 56, the output of which is fed back to the inhibit input terminal of gate 54. One-shot multivibrator 56 responds to the trailing edge of the pulses derived from trigger circuit 55 to derive, in response to each pulse coupled through gate 54, a pulse having a duration slightly greater than the period between adjacent pulses from source 51. The pulses generated by one-shot multivibrator 56 are fed back to the inhibit input terminal of gate 54 to prevent further pulses from source 51 from being coupled through the gate immediately after the generation of an X-ray enabling pulse from the trigger circuit 55. Thus, if two helicopters have multivibrators 51 that repeatedly derive output pulses in time coincidence at the same frequency, a pulse is derived from each radiation source for every other occurrence of a pulse from the multivibrator and one radiation source is not blanked.

X-ray source and power supply 53 comprise low voltage, relatively high current D.C. source 57 that is coupled to primary winding 58 of transformer 59 via electronic switch 61 that is controlled in response to pulses derived from electronic trigger circuit 55. Switch 61 is normally open and is closed only during the 1 millisecond time interval during which pulses are generated by trigger circuit 55. For the 1 millisecond time interval that switch 61 is closed, D.C. source 57 applies a current pulse to primary winding 58 of step-up transformer 59, whereby there is induced in each of secondary windings 62–65 a high voltage, low current pulse to forward bias the anode of each of X-ray tubes 66–69. During the 1 millisecond interval when current is supplied to primary winding 58, the cathode 71 of each of tubes 66–69 emits electrons, whereby X-rays are derived from anodes 72 of the corresponding tubes.

A number of X-ray tubes or an omnidirectional nucleonic source may be used to provide full azimuthal coverage. In a preferred embodiment, four tubes 66–69 are provided to enable each of the sources to emit X-rays over a complete 360° field. Hence, the anodes 72 of the several X-ray tubes are positioned at right angles with respect to each other, with the anodes or tubes 66 and 67 being responsive to electrons accelerated in a direction at right angles from the direction that electrons are accelerated through tubes 68 and 69. Of course, to achieve the required 360° X-ray beam, the anodes 72 of tubes 66 and 67 are positioned at 45° angles with respect to the electron beams emitted from the corresponding cathodes 71. Similarly, the anodes 72 of tubes 68 and 69 point at opposite 45° angles from the electron beams emitted from cathodes 71 of the respective tubes.

In order to derive accurate range information in accordance with Equation 1, the X-ray radiation derived from each of the sources must be calibrated whereby the voltage of the source 57 is stabilized. In addition, precision between the turns ratio of primary winding 58 and each of secondary windings 62–65 of transformer 59 is maintained in order to derive constant level input pulses to each of the tubes 66–69. Further, the intensity of the X-rays derived from each of tubes 66–69 is maintained constant by providing the anode 71 of each tube with an indirectly heated filament, the voltage of which is stabilized. Each of the stabilized voltages is achieved utilizing conventional D.C. voltage regulation apparatus.

Reference is now made to FIG. 3 of the drawing wherein there is illustrated a preferred embodiment for range computer 34. The circuit of FIG. 3 derives a pulse having a time position commensurate with the range of the helicopter to which the receiving array is responsive, as determined by the amplitude of the $B_1'$ voltage pulse derived from subtraction network 32. The D.C. pulse derived from subtraction network 32 is coupled to cascaded integrators 81 and 82. The capacitors of integrators 81 and 82 are disabled except during the interval when a $B_1'$ pulse is derived from subtraction network 32. Integrators 81 and 82 are enabled and disabled in response to pulses derived from delay networks 37 and 38 in the same manner as the capacitors of integrators 35, 41 and 42, FIG. 2.

In response to the pulse applied to integrators 81 and 82, the former integrator derives a negatively increasing ramp voltage having a slope proportional to the magnitude of the pulse applied to its input. Integrator 82 changes the shape of its linearly increasing negative input voltage to a positively going voltage varying as a square law with respect to time. The rate at which the square law output from integrator 82 increases is determined by the amplitude of the $B_1'$ pulse applied to integrator 81 so that the voltage derived from integrator 82 during the interval when the integrator capacitor is not short circuited is directly proportional to $B_1' t^2$.

Simultaneously with the enabling of the capacitors or integrators 81 and 82, switching device 83, series connected between the negative terminal of D.C. source 84 and the parallel combination of resistance 85 and capacitor 86, is opened in response to the output of delay network 37. During the interval when the capacitors of integrators 81 and 82 are disabled, D.C. source 84 maintains a constant voltage across resistor 85 and capacitor 86. In response to opening of switching device 83, which may comprise an electronic switching transistor, the charge applied to capacitor 86 by source 84 leaks off of the capacitor through resistor 85, whereby the magnitude of the negative voltage at the ungrounded terminal of the capacitor 86 decreases in accordance with $$\exp\left(\frac{t}{R_{85}C}\right)$$

where $R_{85}$ is the value of resistance 85 and C is the value of capacitance 86. After a sufficient time interval has elapsed, as determined by the duration of the pulses derived from the pulsating X-ray sources on board each of the helicopters in the formation and the delay time of network 38, switch 83 is closed simultaneously with the reestablishment of short circuits across the capacitors of the integrators 81 and 82. Thereby, the negative voltage of source 84 is reestablished across capacitor 86 and the charges established across the capacitors of integrators 81 and 82 during the computation cycle just considered are removed to enable a new computation cycle to be started without the effects of the cycle just considered.

To derive a pulse occurring at a time commensurate with the range of the helicopter from which radiation is impinging on the array comprising receivers 21–24, the voltages derived from integrator 82 and capacitor 86 are compared in network 87. Network 87 comprises summation amplifier 88 for linearly combining the positive square law increasing voltage from integrator 82 with the exponentially changing voltage across capacitor 86. In response to a zero voltage being applied to summation amplifier 88, i.e., when the magnitude of the $B_1' t^2$ voltage from integrator 82 equals the magnitude of the exponential voltage across capacitor 86, threshold detector 89 generates an output pulse.

By making the time constant of resistance 85 and capacitor 86 equal to $\lambda$ (with an appropriate seconds/foot scale factor) in Equation 1, it is seen that the time ($t$) when the two inputs to summation amplifier 88 are equal $$\left(B_1' t^2 = e^{\frac{-t}{\lambda}}\right)$$

is commensurate with range in accordance with Equation 1. The output pulse of threshold detector 89, occurring at time $t=R$, can be used in any type of time to voltage converter 90 to yield a voltage equal to the range R. This voltage R can then be applied to comparator 36 (see FIG. 2). When the range computer in FIG. 3 is used in place of range computer 34, allowance must be made for the time required to develop the voltage R.

The range determining network of FIG. 3 is preferred over the range computer 34 of FIG. 2 because the input voltage characteristic of range computer 34 is subject to drift. In particular, the diodes and biasing voltage in the non-linear network of range computer 34 are subject to variation as a function of time or temperature, whereby the amplitude of the $B_1'$ pulse is not always converted into an accurate voltage proportional to range. In the network of FIG. 3, however, the capacitors of integrators 81 and 82 are reset after each computation cycle, whereby the possibility of drift is materially reduced. Also, the network of FIG. 3 yields a continuous solution for the output R, "exact" for all values of R, whereas the diode nework type of range computer yields a piecewise continuous solution R.

While I have described and illustrated several specific embodiments of my invention, it will be clear that variations of the details of construction which are specifically illustrated and described may be made without departing from the true spirit and scope of the invention as defined in the appended claims.

I claim:

1. A method of determining the relative position of more than two objects in a group comprising the steps of emitting discrete pulses of penetrating radiation from a plurality of said objects, detecting said pulses on one of said objects, and processing said pulses in a single time shared channel so that the amplitude of each as it is detected is transposed into a signal indicative of the position of the object that emitted the pulse relative to the object where the pulses are detected.

2. The method of claim 1 further including the step of preventing simultaneous pulse derivation from a plurality of said objects.

3. The method of claim 1 further including the step of disabling each of said sources for a time period subsequent to the derivation of a pulse by it.

4. The method of claim 1 further including the step of disabling a source when a source on any other object in the group is activated.

5. The method of claim 4 further including the step of disabling each of said sources for a time period subsequent to the derivation of a pulse by it.

6. The method of claim 1 further including the step of displaying said signals as a PPI on an oscilloscope.

7. The method of claim 1 wherein the pulses derived from each of said sources have a predetermined repetition rate, the repetition rates of said different sources being related to each other by prime numbers.

8. A system for deriving information indicative of the range and angular position of a source of penetrating radiation comprising a stationary array of at least three receivers for said radiation, shield means disposed between said receivers for varying the relative amount of said radiation impinging on each of said receivers in response to the angular position of said source, said shield means and receivers being arranged so that the response of each of said receivers is periodic with respect to the angular position of said source, the periodicity of said receivers being substantially the same but displaced in angular position relative to each other, means for deriving a signal proportional in magnitude to the amount of said radiation impinging on each of said receivers, means for combining said signals for deriving a first signal having an occurrence time indicative of the range of said source and for deriving a second signal proportional to the angular position of said source, and means for displaying said second signal in response to the occurrence of said first signal.

9. A system for deriving information indicative of the range, R, and angular position, $\theta$, of a radiation source that is attenuated in a predetermined manner as a function of distance comprising a stationary symmetrical array of receivers for said radiation, means responsive to the amplitude of energy from said source received by said receivers for deriving a first signal having an occurrence time relative to a reference time position, said occurrence time being a function of the range of said source, and for deriving a second signal having an amplitude proportional to the product of a function of $\theta$, R and $t$, where $t$ is time from said reference time position, and means for displaying said second signal in response to the occurrence of said first signal to derive an indication of range and angular position.

10. A system for deriving information indicative of the range, R, and angular position, $\theta$, of a radiation source that is attenuated in a predetermined manner as a function of distance comprising a stationary symmetrical array of receivers for said radiation, a display having a coordinate system origin from which a spot is deflected, means for causing said spot to describe a path from said origin as a function of time from a reference time position, means responsive to the amplitude of energy from said source received by said receivers for controlling the shape of said path as a function of $\theta$, and means responsive to said receivers for activating the spot of said display only at a time from said reference time position that is a predetermined function of range.

11. The system of claim 10 wherein said display comprises a cathode ray tube.

12. The system of claim 10 wherein radiation from said source decreases as a function of range in accordance with $$\frac{Ke^{\frac{-R}{\lambda}}}{R^2}$$

where $e$ is the base of natural logarithms, and $\lambda$ and K are constants, said spot activating means comprises means for deriving exponentially decreasing and parabolic increasing voltages varying as a function of time, said voltages being initiated at said reference time, means for controlling the rate of said parabolic increasing voltage as a function of range, and means for activating said spot when said two voltages are equal.

13. A system for deriving an output signal having a time position relative to a reference time indicative of the value of R in the equation $$B = \frac{Ke^{\frac{-R}{\lambda}}}{R^2}$$

where B is an input variable, $e$ is the base of natural logarithms, K and $\lambda$ are constants; comprising means for deriving a variable input signal having an amplitude B, means responsive to said input signal for deriving a voltage proportional to $Bt^2$, where $t$ is time from said reference time, means for deriving an exponentially decreasing voltage proportional to $$e^{\frac{-t}{\lambda}}$$

and means for deriving said output signal in response to said two voltages being equal.

14. The system of claim 13 wherein said means for deriving the voltage proportional to $Bt^2$ comprises a pair of cascaded integrators responsive to a D.C. voltage proportional to B, and said means for deriving the voltage proportional to $$e^{\frac{-t}{\lambda}}$$

comprises a resistance-capacitance network responsive to a constant D.C. voltage.

15. A system for deriving information indicative of the range, R, and angular position, $\theta$, of a radiation source that is attenuated in a predetermined manner as a function of distance comprising a stationary symmetrical array of receivers for said radiation, means responsive to the amplitude of energy from said source received by said receivers for deriving a first signal having an amplitude B indicative of range in accordance with said function, means responsive to the amplitude of energy from said source received by said receivers for deriving second and third signals respectively having amplitudes proportional to $B \sin \theta$ and $B \cos \theta$, means for integrating said second and third signals for deriving signals proportional to $tB \sin \theta$ and $tB \cos \theta$, where $t$ is time from a reference time position, means responsive to said first signal for deriving a time position indication at a variable time $T=R/B$, from said reference time position, a display having a pair of orthogonally arranged spot deflecting means respectively responsive to said $Bt \sin \theta$ and $Bt \cos \theta$ signals, and means for activating the spot of said display in response to said time position indication when $t=T$.

16. The system of claim 15 wherein said range signal B decreases in accordance with $$\frac{e^{\frac{-R}{\lambda}}}{R^2}$$

where $\lambda$ is a constant and $e$ is the base of natural logarithms, said time position indication deriving means comprises means responsive to said first signal for deriving a voltage proportional to $Bt^2$, means for deriving an exponentially decreasing voltage proportional to $$e^{\frac{-t}{\lambda}}$$

and means for deriving said indication in response to said two voltages being equal.

17. The system of claim 15 wherein said display comprises a cathode ray tube.

18. In a system for determining the relative position of a plurality of objects in a group of objects, one of said objects comprising a source of penetrating radiation, means for activating said source so that penetrating radiation pulses are derived from it, a detector responsive to penetrating radiation from the other objects shielded from the source on said one object, and means for disabling the source on said one object in response to penetrating radiation from the other objects being detected by said detector.

19. The system of claim 18 further including means for disabling the source on said one object for a predetermined time interval subsequent to a pulse being derived from the source on said one object.

20. The system of claim 19 wherein said detector comprises a stationary symmetrical array of receivers for said radiation, means responsive to said receivers for deriving a first signal having an occurrence time relative to a reference time position that is a function of the range of said source and for deriving a second signal having an amplitude proportional to the product of a function of $\theta$, R and $t$, where: $t$ is time from said reference time position, R and $\theta$ are range and angle between the object and another object in the group; and means for displaying said second signal in response to the occurrence of said first signal to derive an indication of range and angular position of said another object.

21. The system of claim 20 wherein said means for displaying comprises a cathode ray tube.

References Cited

UNITED STATES PATENTS

| | | | |
|---|---|---|---|
| 2,874,303 | 2/1959 | Lane | 250—106X(T) |
| 3,167,652 | 1/1965 | Weisbrick, Jr. | 250—71 |
| 3,293,436 | 12/1966 | Wilcox | 250—83.3 |
| 3,315,076 | 4/1967 | Jordan | 250—83.3 |
| 3,363,100 | 1/1968 | Cohen et al. | 250—71.5 |

ARCHIE R. BORCHELT, Primary Examiner

D. L. WILLIS, Assistant Examiner

U.S. Cl. X.R.

250—71.5, 102, 106